United States Patent
Hall et al.

(10) Patent No.: US 7,631,618 B2
(45) Date of Patent: Dec. 15, 2009

(54) DAMAGE PROTECTED MOTOR VEHICLE FAN

(75) Inventors: Derek Scott Hall, Dubuque, IA (US); Kevin Lee Pfohl, Potosi, WI (US); Jahmy Jomont Hindman, Durango, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/959,677

(22) Filed: Dec. 19, 2007

(65) Prior Publication Data

US 2009/0159020 A1 Jun. 25, 2009

(51) Int. Cl.
*F01P 7/14* (2006.01)
(52) U.S. Cl. ............ 123/41.1; 165/200; 165/120
(58) Field of Classification Search .......... 123/41.1, 123/41.11, 41.15, 41.7, 41.03, 41.55, 41.01, 123/41.31, 41.29, 41.12, 41.49, 41.65, 41.66, 123/41.56, 41.57, 198 D, 198 DB, 198 DC; 165/120, 121, 122, 299, 200, 287
See application file for complete search history.

(56) References Cited

U.S. PATENT DOCUMENTS

| 2,913,083 | A | | 11/1959 | Bachle et al. | |
|---|---|---|---|---|---|
| 4,157,739 | A | | 6/1979 | Frye | |
| 4,344,338 | A | * | 8/1982 | Hattori et al. | 192/61 |
| 4,730,664 | A | * | 3/1988 | Forsthuber et al. | 165/41 |
| 4,788,943 | A | * | 12/1988 | Hayashi | 123/41.27 |
| 5,359,969 | A | * | 11/1994 | Dickrell et al. | 123/41.12 |
| 5,496,154 | A | * | 3/1996 | Hall et al. | 417/223 |
| 5,579,728 | A | * | 12/1996 | Gotmalm | 123/41.55 |
| 5,609,125 | A | * | 3/1997 | Ninomiya | 123/41.12 |
| 5,778,693 | A | * | 7/1998 | Mientus | 62/181 |
| 6,142,110 | A | * | 11/2000 | Bartley et al. | 123/41.49 |
| 6,463,893 | B1 | * | 10/2002 | Foster et al. | 123/41.49 |
| 6,750,623 | B1 | * | 6/2004 | McCauley et al. | 318/260 |
| 7,275,368 | B2 | | 10/2007 | Furuta et al. | |
| 2004/0118114 | A1 | * | 6/2004 | Chiaramonte | 60/422 |
| 2008/0074247 | A1 | * | 3/2008 | Plantamura | 340/438 |

FOREIGN PATENT DOCUMENTS

JP 2004144000 A * 5/2004

* cited by examiner

*Primary Examiner*—Michael Cuff
*Assistant Examiner*—Hung Q Nguyen
(74) *Attorney, Agent, or Firm*—Baker & Daniels LLP

(57) ABSTRACT

Generally disclosed and claimed is an non-belt driven motor vehicle cooling fan having an interruptible driving force such as electrical or hydraulic driving force. More specifically disclosed is a vehicle cooling fan having an driving force interrupted when the vehicle enters water that may contact the fan.

27 Claims, 3 Drawing Sheets

DAMAGE PROTECTED MOTOR VEHICLE FAN

Motor vehicles powered by internal combustion engines customarily employ a means of cooling the engine involving a coolant fluid circulating in a jacket around the combustion cylinders, or less frequently, direct air cooling with air flow enhanced by a fan. Coolant fluid heated by the engine is cooled for re-circulation by a heat exchanger or radiator. The radiator in turn is most often cooled by air with air flow enhanced by a driven fan.

While the instant invention is discussed in terms of engine coolant, the invention applies equally to heat exchangers for engine oil, hydraulic oil, transmission oil, engine charge air, axle oil cooler and other functions where fan-enhanced air flow for cooling heat exchange is employed.

While in common experience the driven fan may be driven by a belt powered from the engine crankshaft, the fan may also be electrically driven from the vehicle electric system, or by a hydraulic system of a vehicle so equipped.

In order to provide sufficient enhanced air flow to a radiator, or direct air cooled internal combustion engine, a bladed fan may rotate at rotational speeds approaching 5000 rpm. When fan blades rotating at a high tangential velocity resulting from the blade length and the rotation rate impact a medium having a density significantly greater than air, damage may result to the fan, including the blades, the blades may separate from their shaft mounting; the separated blades may contact other engine or vehicle components resulting in further consequential damage.

U.S. Pat. No. 2,913,083 addressed the problem of a vehicle fan impacting water as the vehicle is partially submerged. The solution offered a driven connection that yielded upon contact by the fan with water.

SUMMARY OF THE INVENTION

There is here provided a vehicle fan powered by means other than belt-power that interrupts the fan driving force so as to slow or halt the rotation prior to the fan blades contacting water. At least one sensor determines the depth of water surrounding the vehicle. When the water reaches a determined level, the system controller interrupts hydraulic fluid flow to the hydraulic motor powering the fan. For a fan having a driving force provided by the vehicle electrical system, the system controller may interrupt the electrical power source to the fan.

DESCRIPTION OF EMBODIMENTS

The instant invention comprises a vehicle capable of at least partial immersion in water having a means for protecting the cooling fan of the internal combustion engine from damage when the level of water is sufficient to contact the rotating fan blades.

First the invention will be described in terms of a hydraulically driven fan. When the vehicle reaches a depth in water sufficient to contact the fan blades the flow of hydraulic fluid to the hydraulic motor driving the fan is interrupted.

Figure 5:
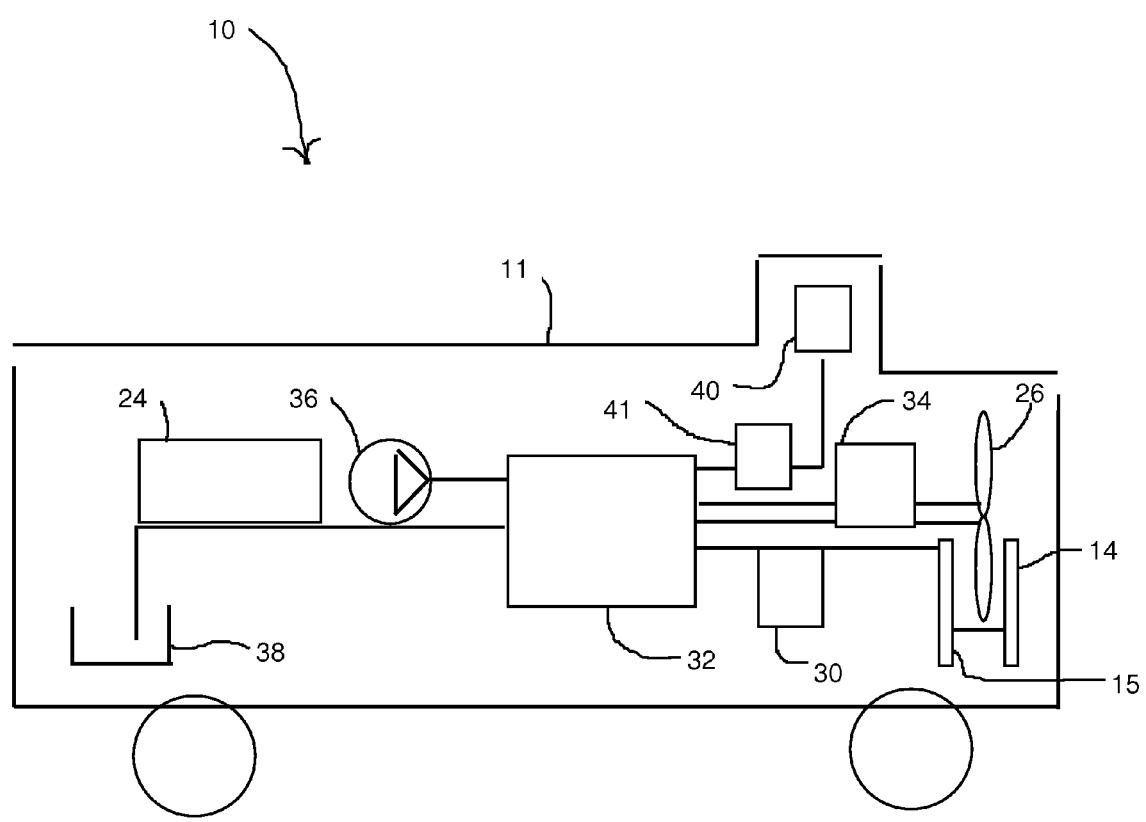
FIG. 5 is a diagrammatic view of a vehicle as described having a hydraulic fluid reservoir, a hydraulic fluid pump, a fan, and a diverter valve.

In a first embodiment of vehicle 10 having chassis 11, the interruption of the flow of hydraulic fluid is initiated by a measurement of the depth of water by one or more pressure sensors 14 and 15. The pressure sensors 14 and 15 communicate with controller 30 (Fig. 5). The controller 30 is in turn in communication with diverter valve 32 (FIG. 5) thereby providing a communication between pressure sensors 14 and 15 and diverter valve 32. Upon activation, diverter valve 32 isolates hydraulic drive motor 34 (FIG. 5) of fan 26 by closing the path of hydraulic fluid to hydraulic drive motor 34 of fan 26. Therefore, diverter valve 32 also isolates fan 26 from hydraulic fluid pump 36 (FIG. 5) and the return path to hydraulic fluid reservoir 38 (FIG. 5). In the absence of a motive force to drive motor 34 fan 26 may be permitted to coast to a stop.

In an alternate embodiment, the diversion of the fan driving force such as electricity (i.e. vehicle electrical system 41) or hydraulic fluid (i.e. hydraulic drive motor 34) may be initiated by activation of an operator accessible switch 40 to interrupt electricity flow to fan motor 34. In the case of a hydraulically driven fan 26, operator accessible switch 40 communicates with diverter valve 32, to by-pass, over-ride, or provide a signal to activate diverter valve 32 in lieu of the sensor-controller link.

The water depth sensor may comprise a float and resistor, a pressure sensor, a conductivity sensor, or other sensor for water level appropriate to the circumstance. Typical pressure sensors are available from American Sensor Technologies, Mount Olive, N.J. 07828 United States as model number AST47LP having a detection pressure range from 0 to 5 psig. Typical conductivity sensors are available from Madison Company, Branford, Conn. 06405, United States as model number C4310.

Location of the sensor within a protective environment protects from false signals as may be initiated by wave action of the water. An open tube or conduit provides a convenient protective environment. A bottom opening in the open tube affords both an entry and drain for water.

Figure 1:
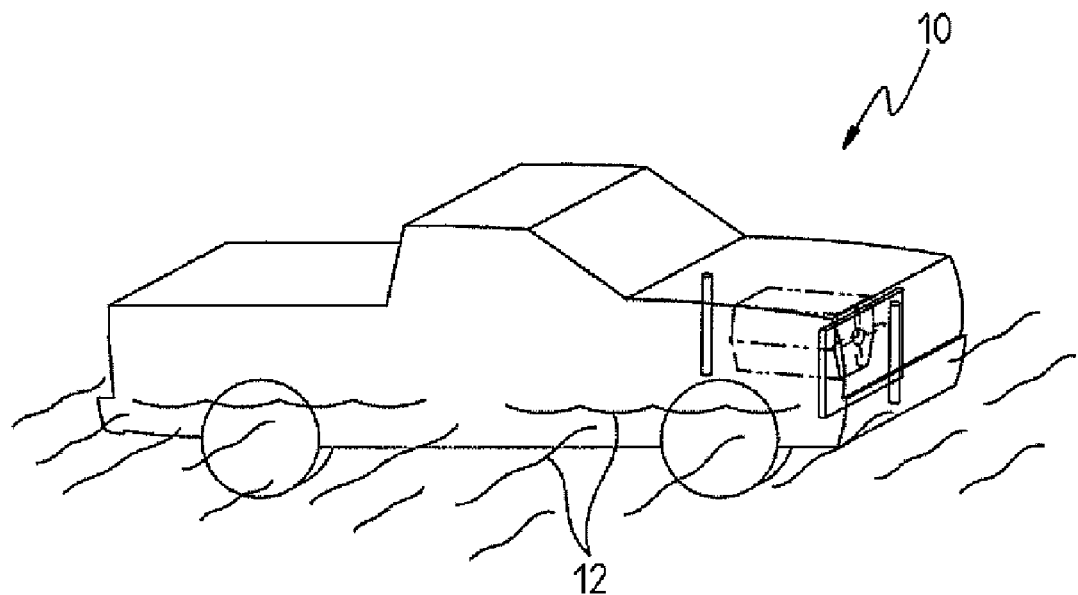
FIG. 1 illustrates a vehicle as described partially submerged in level water.
Figure 2:
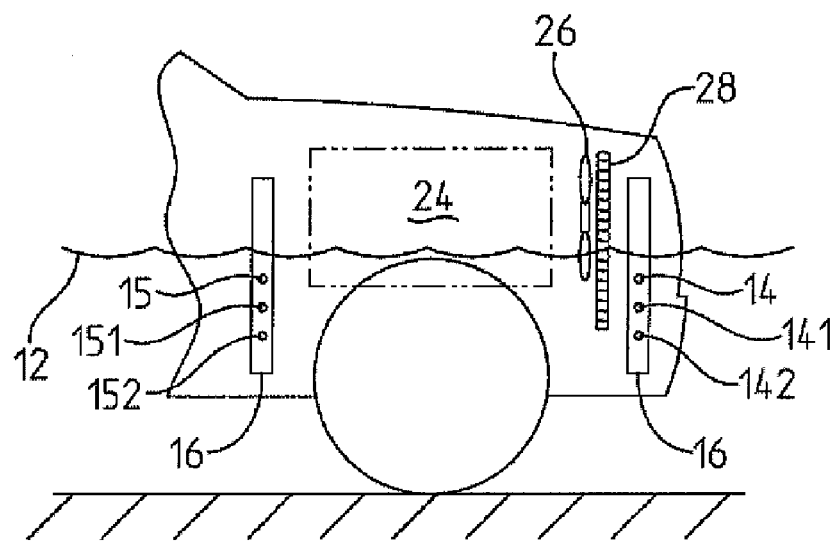
FIG. 2 illustrates a plurality of contact water sensors on a vehicle under the condition of FIG. 1.

The Figures illustrated the practical application of the invention. FIG. 1 illustrates an internal combustion engine powered motor vehicle 10 partially submerged in water 12. In FIG. 2 the sensors 14, 141, 142, 15, 151, 152 (conductivity-type) protected within tubes 16 provide data to a controller (not shown) in the form of electrical signals. The controller determines whether the extent of submersion is sufficient to suspend the flow of pressurized hydraulic fluid to the fan hydraulic motor. As illustrated in FIG. 1, and FIG. 2 the vehicle is level in water. The controller receives a signal from both sensors 14, and 15 indicating that the water level threatens damage to the fan, which initiates an interruption of driving force to the fan motor.

When the water level signals of the forward and rearward sensors are combined by the controller the combined data and an appropriate algorithm could determine the attitude of the vehicle with respect to the horizontal also called pitch. When combined with the appropriate algorithm, the controller determines when the water level is sufficient to divert the flow of pressurized hydraulic fluid to the fan hydraulic motor thereby preserving the fan and the motor vehicle from damage.

Figure 3:
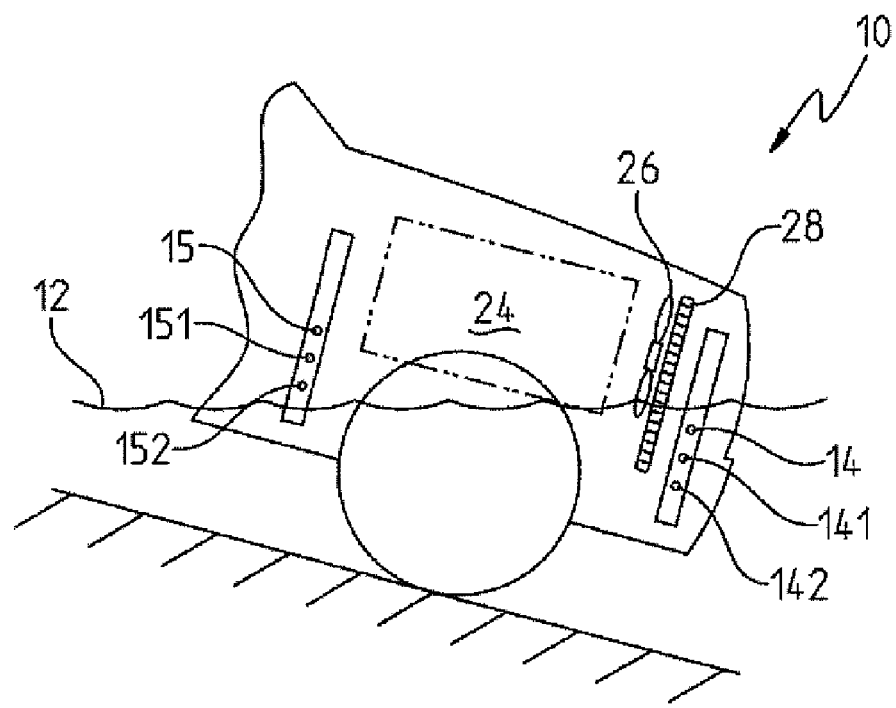
FIG. 3 illustrates a vehicle on an inclined surface entering water.

FIG. 3 illustrates the motor vehicle on an inclined surface entering water. In the direction of travel of the vehicle, forward, sensor 14 is immersed in water, but sensor 15 is not immersed. The controller algorithm may be programmed to divert hydraulic fluid flow if but one sensor of 14 or 15 indicates immersion in water. In appropriate circumstances a plurality of controllers may be employed as illustrated by sensors 141, 142, 151, 152 in combination with appropriate algorithms to provide closer control over fan interruption and account for various slopes of surfaces on which the vehicle operates.

In an alternative embodiment, sensors indicating the presence of water combined with an inclinometer and an appropriately programmed controller may replace additional sensors to provide data to the controller concerning the vehicle pitch and the presence of water.

Figure 4:
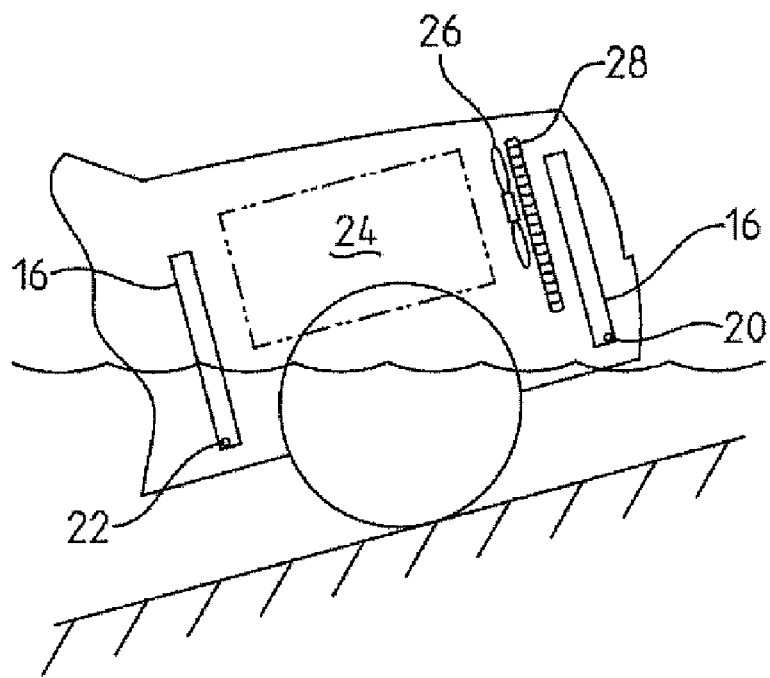
FIG. 4 illustrates a vehicle having pressure type sensors on an inclined surface exiting water.

FIG. 4 illustrates the motor vehicle exiting water. The combined sensors again provide data to the controller which, when programmed with appropriate algorithms, determines when the water level has receded sufficiently to resume flow of hydraulic fluid to power the fan 26 to provide air flow through the radiator 28. FIG. 4 further illustrates a single sensor 20 in front of and one sensor 22 to the rear of the engine 24. Rather than a sensor of the conductivity-type, the sensor illustrated in FIG. 4 is a pressure-type sensor 20, 22. The signal provided the controller indicates the water level in the vicinity of the fan based on the pressure in tube. A single pressure sensor per location is sufficient to indicate the water level.

Other sensors are contemplated by the invention here described and claimed such as a float-type sensor.

It will be observed that vehicle is illustrated with respect to forward/rearward orientation. The principle also applies to a side-to-side orientation. If side-to-side attitude, often called "roll" becomes significant in the use of the motor vehicle, then additional sensors to measure water elevation side-to-side and associated suitable algorithms may be provided by an appropriately programmed controller.

In an alternative embodiment, a combination of water sensors and an inclinometer in communication with an appropriately programmed controller can provide roll data to the controller concerning the vehicle roll and the presence of water.

The invention described and claimed finds utility in off-road recreation vehicles, heavy equipment used in construction and forestry applications such as loaders, dozers, tree harvesters, and similar vehicles employed on off-road applications particularly those making use of air-cooled fluid heat exchangers. Such air-cooled fluid heat exchangers include engine coolant radiators, transmission coolers, air-conditioning condensers, and similar heat exchangers. The device may also find application for vehicles powered by air-cooled engines having fan driven coolant air.

While described heretofore in terms of a hydraulically powered cooling fan, a vehicle having an electrically powered fan may similarly be protected from damage to the fan, and vehicle components. In an embodiment having a fan driven by an electric motor, a signal from the controller causes an interruption of electrical power to the fan motor by a switch.

The invention claimed is:

1. A motor vehicle having a powered fan enhanced cooling system comprising:
   a chassis,
   an engine supported by the chassis, and
   a fan operably connected to an interruptible driving force, the interruptible driving force providing power to the fan when a fluid external to the vehicle is at a first level relative to the vehicle, the interruptible driving force interrupting power to the fan when the fluid is at a second level relative to the vehicle, the second level located beneath the fan, whereby the interruptible driving force interrupts power to the fan before the fan contacts the fluid.

2. The motor vehicle of claim 1 wherein the interruptible driving force is interrupted by an operator accessible switch.

3. The motor vehicle of claim 1 wherein the interruption of the driving force is initiated by a water-level sensor in communication with a controller;
   the controller is programmed to direct an interruption of the interruptible driving force in response to a signal of the presence of water from the water-level sensor.

4. The motor vehicle of claim 3, wherein the water-level sensor is a conductivity sensor.

5. The motor vehicle of claim 3, wherein the water-level sensor is a pressure sensor.

6. The motor vehicle of claim 3, wherein the water-level sensor is float sensor.

7. The motor vehicle of claim 3, wherein at least two sensors are provided.

8. The motor vehicle of claim 7, wherein the controller compares signals from the at least two sensors to determine an angle of the vehicle relative to the horizon.

9. The motor vehicle of claim 8 further including an inclinometer in communication with the controller to determine the angle of the vehicle relative to the horizon.

10. The motor vehicle of claim 1 wherein the driving force is pressurized hydraulic fluid and the interruption is provided by a diverter valve.

11. The motor vehicle of claim 1, further comprising a vehicle electrical system and a switch, wherein the power to the fan is provided by the vehicle electrical system and the interruption is provided by the switch.

12. A motor vehicle having a hydraulically driven fan cooling system comprising:
   a hydraulic fluid reservoir operably connected to a hydraulic fluid pump, the hydraulic fluid pump providing pressurized hydraulic fluid;
   a fan operably connected to the hydraulic pump to receive pressurized hydraulic fluid;
   a diverter valve in series between the hydraulic pump and the fan;
   a controller operably in communication with the diverter valve; and
   a water-level sensor in communication with the controller, the water-level sensor located beneath the fan,
      wherein the diverter valve interrupts the flow of pressurized hydraulic fluid to the fan in response to a signal from the water-level sensor indicating the presence of fluid external to the vehicle before the fluid contacts the fan.

13. The motor vehicle of claim 12 further comprising an operator accessible switch operably connected to the diverter valve.

14. The vehicle of claim 12 further including at least two additional sensors, wherein the controller compares signals from the sensors to determine an angle of the vehicle relative to the horizontal and side-to-side orientation data of the vehicle.

15. The vehicle of claim 12 wherein the sensor is a conductivity-type sensor.

16. The vehicle of claim 12 wherein the sensor is a pressure-type sensor.

17. The vehicle of claim 12 wherein the sensor is a float-type sensor.

18. The vehicle of claim 14 further including an inclinometer in communication with the controller to determine the angle of the vehicle relative to the horizon.

19. The vehicle of claim 14 further including an inclinometer in communication with the controller to determine the side-to-side orientation data of the vehicle.

20. A damage protection system for use with a vehicle having a fan driven by a driving force of the vehicle, the system comprising:
a diverter in series between the fan and the driving force,
a controller in operable communication with the diverter, the controller configured to command the diverter to operably separate the fan from the driving force,
a first water-level sensor supported by the vehicle at a location forward of the fan, the first water-level sensor in operable communication with the controller, the first sensor being configured to detect water external to the vehicle and forward of the fan, the sensor being configured to signal to the controller the presence of the water,
a second water-level sensor supported by the vehicle at a location behind the fan, the second water-level sensor in operable communication with the controller, the second sensor being configured to detect water external to the vehicle and behind the fan, the sensor being configured to signal to the controller the presence of the water,
wherein the controller is configured to analyze the signal from the first sensor and the signal from the second sensor to determine whether the water-level threatens damage to the fan, wherein if the water-level threatens damage to the fan, the controller commands the diverter to operably separate the fan from the driving force.

21. The system of claim 20 wherein the first and second water-level sensors are selected from the group consisting of a conductivity-type sensor, a pressure-type sensor, and a float-type sensor.

22. The system of claim 20 wherein the driving force is pressurized hydraulic fluid.

23. The motor vehicle of claim 1, further including:
a controller;
a first water-level sensor supported by the vehicle at a location forward of the fan, the first water-level sensor in operable communication with the controller, the first sensor being configured to detect water external to the vehicle and forward of the fan, the sensor being configured to signal to the controller the presence of the water,
a second water-level sensor supported by the vehicle at a location behind the fan, the second water-level sensor in operable communication with the controller, the second sensor being configured to detect water external to the vehicle and behind the fan, the sensor being configured to signal to the controller the presence of the water,
wherein the controller is programmed to direct an interruption of the interruptible driving force in response to a signal of the presence of water from at least one of the first and the second water-level sensors.

24. The motor vehicle of claim 1, further including a water-level sensor supported by the vehicle at a location rearward of the engine with the fan located forward of the engine.

25. The motor vehicle of claim 12 further comprising another water-level sensor in communication with the controller and located above the water-level sensor.

26. The system of claim 20 wherein the first sensor detects water external to the vehicle before the second sensor when a rear end of the vehicle is elevated relative to a front end of the vehicle.

27. The system of claim 20 wherein the second sensor detects water external to the vehicle before the first sensor when a front end of the vehicle is elevated relative to a rear end of the vehicle.

* * * * *